US009847970B1

(12) United States Patent
Zipperer et al.

(10) Patent No.: US 9,847,970 B1
(45) Date of Patent: Dec. 19, 2017

(54) DYNAMIC TRAFFIC REGULATION

(71) Applicant: Amazon Technologies, Inc., Reno, NV (US)

(72) Inventors: Joseph Paul Zipperer, Seattle, WA (US); Andrew Bruce Dickinson, Seattle, WA (US); Kirk Arlo Petersen, Nevada City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/266,619

(22) Filed: Apr. 30, 2014

(51) Int. Cl.
*H04L 29/06* (2006.01)

(52) U.S. Cl.
CPC .......... *H04L 63/02* (2013.01); *H04L 63/1458* (2013.01)

(58) Field of Classification Search
CPC ..... H04L 4163/0227; H04L 4163/0263; H04L 47/623; H04L 47/10; H04L 47/12; H04L 47/13; H04L 47/22; H04L 47/66
USPC ..................................................... 726/11, 13
See application file for complete search history.

(56) References Cited

U.S. PATENT DOCUMENTS

| | | | | |
|---|---|---|---|---|
| 7,613,132 | B2 * | 11/2009 | Tripathi et al. ............... | 370/255 |
| 7,801,128 | B2 | 9/2010 | Hoole et al. | |
| 7,925,766 | B2 * | 4/2011 | Jayawardena .......... | H04L 45/00 370/401 |
| 8,272,044 | B2 * | 9/2012 | Ansari et al. .................... | 726/13 |
| 2002/0083175 | A1 * | 6/2002 | Afek .................... | H04L 63/1416 709/225 |
| 2006/0230444 | A1 * | 10/2006 | Iloglu ................. | H04L 63/1408 726/14 |
| 2012/0317276 | A1 * | 12/2012 | Muniraju ...................... | 709/224 |
| 2013/0003538 | A1 * | 1/2013 | Greenberg et al. ........... | 370/230 |
| 2015/0365428 | A1 * | 12/2015 | Be'Ery ............... | H04L 63/1416 726/23 |

OTHER PUBLICATIONS

U.S. Appl. No. 14/204,864, filed Mar. 11, 2014, Zipperer et al.
Web article: "Network ACLs" published by Amazon, 2014 [online][retrieved on Jan. 14, 2014] retrieved from: http://docs.aws.amazon.com/AmazonVPC/latest/UserGuide/VPC_ACLs.html, 7 pps.
Web article: "Access Control List", published by Wikipedia, 2014, [online][retrieved on Jan. 14, 2014] retrieved from: http://en.wikipedia.org/wiki/Access_control_list , 4 pps.

* cited by examiner

*Primary Examiner* — John B King
(74) *Attorney, Agent, or Firm* — Lee & Hayes, PLLC

(57) ABSTRACT

Functionality is disclosed herein for regulating bandwidth that is available for network traffic flowing through a data communications network. In response to attack traffic being detected, one or more traffic regulators are set to control an available bandwidth to be used by the attack traffic. The one or more traffic regulators are adjusted until an attack is no longer detected. After the attack ends, the traffic regulator may be disabled or set to a different mode of operation.

20 Claims, 8 Drawing Sheets

DYNAMIC TRAFFIC REGULATION

BACKGROUND

Network attacks on computer networks and network-based services have become commonplace. These network attacks may be active attacks that attempt to affect the operation of a network or passive attacks that attempt to obtain information from a network. There are many different types of network attacks, such as eavesdropping attacks, spoofing attacks, password-based attacks, Denial-of-Service ("DoS") attacks, Man-in-the-Middle attacks and the like. Some network attacks, such as a DoS attack, are designed to disrupt or disable a network by flooding the network with large amounts of useless traffic. A successful DoS attack on a network may disable all or a portion of the network. For example, a network may become unreachable, the network may be slow to respond, a website may become unreachable and the like.

Defending against these network attacks can be very challenging. For example, network operators may include different types of security measures, such as deploying one or more firewalls to help prevent unauthorized traffic from entering a network. Network administrators may also create security policies that may specify the network traffic that is authorized to flow through a point in the network. Managing these security measures for a large network-based service that includes a large number of computing resources presents even more challenges. For example, managing all of the different firewalls, routers, switches, and network traffic rules that may be included in a large network may be extremely difficult. The disclosure made herein is presented with respect to these and other considerations.

DETAILED DESCRIPTION

Figure 1:
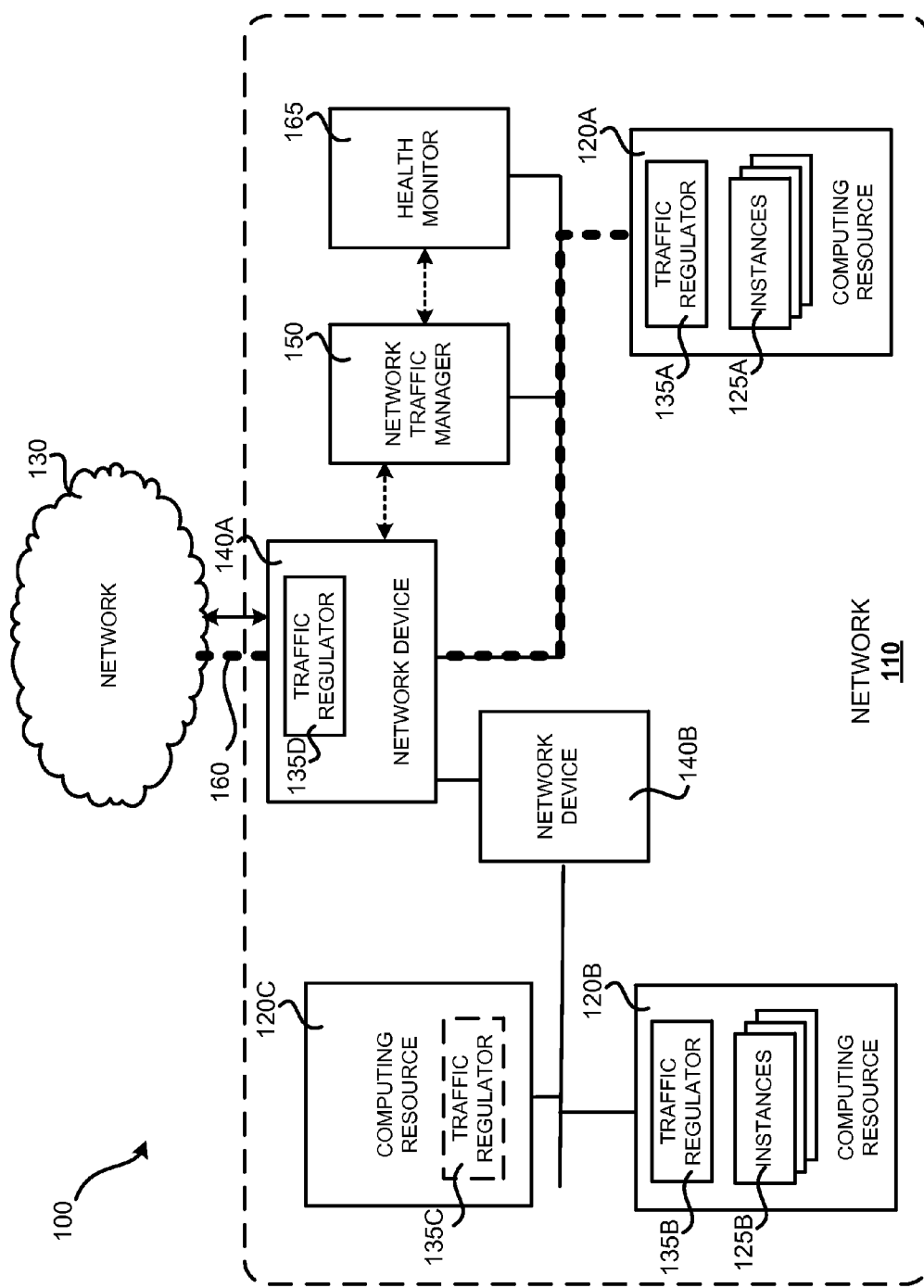
FIG. 1 is a network architecture diagram showing aspects of one illustrative mechanism described herein for adjusting one or more traffic regulators that are used to dynamically regulate traffic that is flowing in a network.

The following detailed description is directed to technologies for dynamic traffic regulation in a network. Utilizing the technologies described herein, one or more traffic regulators are adjusted during a time of an attack, such as a DoS attack, to regulate the amount of network traffic (e.g., data packets) that is flowing through the traffic regulators. In one example, the one or more traffic regulators are adjusted to change the available bandwidth. As used herein, the term "bandwidth" refers to a data transfer rate that is supported by a network connection. A bandwidth may be expressed as bytes per second, bits per second, megabytes per second, and the like. As available bandwidth increases for a connection, the amount of data that can flow through the connection also increases.

A traffic regulator may implement different traffic regulation mechanisms to reduce the flow of traffic to one or more computing resources, such as, but not limited to dropping packets, prioritizing packets, re-routing packets and storing packets. These mechanisms may be implemented by one or more specialized or non-specialized computing resources. For example, the computing resources may be general-purpose computing resources, such as server computing devices, or computing resources dedicated to processing network traffic, such as network switches, routers, firewalls, intrusion detection systems, and the like.

When an attack on a network starts, attack traffic begins to flow from an entry point to one or more locations within the network. For example, the attack traffic may be flowing toward one or more computing resources, such as virtual machine instances, in the network. As used herein, the term "instance" refers to an instance of a virtual machine. The term "customer instance" refers to an instance of a virtual machine in use by a customer of a service provider that operates a service provider network in which the instance is executing. Computing resources might also include networking resources, storage resources, or other types of computing resources, which may be available from a service provider on a permanent or as-needed basis.

An attack on a network may be detected using different mechanisms. For example, a computing resource that is in the path of attack traffic may detect an attack by detecting an increase in network traffic (which may be referred to herein as "attack traffic"). A computing resource that is configured to monitor network traffic or the health of the network might also detect the attack. A message indicating that an attack has been detected may be sent to a network traffic manager by one or more computing resources that detect the attack. After detecting an attack, one or more entry points for the attack might also be identified. For example, a determination may be made as to whether the attack traffic originates from outside of the network and/or from a location that is within the network.

One or more locations in a network might also be chosen to perform the dynamic traffic regulation disclosed herein. In one example, a location in the network that is selected to perform the dynamic traffic regulation has available bandwidth to handle the attack traffic. The selected location also includes a computing resource that is capable of processing the flow of attack traffic without becoming overwhelmed. For instance, one or more traffic regulators might be located close to the entry point of the attack and near an edge of the network.

In one example, the packet processing capabilities of computing resources (e.g., computing devices, virtual machine instances) are determined before an attack occurs. In one example, the packet processing capabilities of a computing resource relates to a number of packets that may be processed by the computing resource within a predetermined period of time (e.g., packets per second).

The packet processing capabilities for computing resources may be determined using different mechanisms. For example, a test may be performed that determines a packet processing capability of the computing resource by flooding a network connection to a computing resource with network traffic until packet errors are detected (e.g., packets dropped). Generally, different types of computing resources will have different packet processing capabilities. For example, less powerful computing resources will have lower packet processing capabilities as compared to more powerful computing resources that will have higher packet processing capabilities.

The packet processing capabilities of the computing resources might be used when adjusting traffic regulators to configure the available bandwidth. For example, a traffic regulator may be configured based on the packet processing capabilities of the computing resources. The traffic regulator might be configured to regulate the bandwidth before an attack is detected or initially when an attack is detected within the network.

During an attack, a traffic regulator may be set to a "dynamic mode" of operation and adjusted to regulate the available bandwidth dynamically. For example, the adjustment to the traffic regulator may occur periodically (e.g., 30 seconds, one minute, five minutes) during an attack. The adjustments to a traffic regulator may increase the available bandwidth or decrease the available bandwidth. For example, when a computing resource is determined to be capable of processing more packets than are currently flowing to the computing resource during an attack, the available bandwidth may be increased. When a computing resource is determined not to be capable of processing more packets than are currently flowing to the computing resource during an attack, the available bandwidth may be decreased.

Health information might also be obtained regarding the computing resources under attack and used when determining whether to increase or decrease the available bandwidth. The health information might be detailed health information for a computing resource (e.g., memory use, processor use, bandwidth use) or non-detailed health information. For example, the non-detailed information might include a determination as to whether the computing resources that are under attack can send or receive a message to another computing device, such as to a network traffic manager. This health information might be obtained from the computing resources that are under attack and/or from a health monitor, or some other computing resource, that is positioned within the network.

In one example, a traffic regulator utilized to counter an attack is adjusted to decrease the available bandwidth until a determination is made that the computing resources under attack are healthy. For example, a computing resource might be considered healthy if it is capable of receiving a message or sending a message. If the computing resource is determined to be healthy during the attack, the traffic regulator might be adjusted to increase the available bandwidth. In an example, the traffic regulator continues to be adjusted to increase the available bandwidth until the computing resources are determined to be unhealthy. This process of dynamically increasing or decreasing the available bandwidth might continue throughout an attack and possibly before and/or after the attack.

When the traffic returns to pre-attack levels (e.g., the flow of the attack traffic ends or reduces), the traffic regulation might be changed or disabled. For example, the configuration of the traffic regulator may be returned to a default configuration (e.g., "a non-attack mode"). Through these mechanisms, and potentially others, the flow of traffic may be dynamically regulated during an attack.

The mechanisms disclosed herein for dynamic traffic regulation might also be integrated with a service provider operated network-based distributed computing environment (which may be referred to herein as a "service provider network") to assist in protecting computing resources when attacked. Such a service provider network allows customers to purchase and utilize computing resources, such as virtual machine instances, data storage resources, database resources, network-accessible services, networking resources and other types of computing resources on a permanent or as-needed basis. As used herein, a "purchase" may result in a one-time payment from a customer or may result in payments from a customer that are made on an ongoing basis depending upon how the computing resource is utilized and executed. In one example, a purchase establishes a subscription that allows a customer to use the computing resource at a specified usage fee. Additional details regarding the various components and processes described above for dynamic traffic regulation will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a network architecture diagram 100 showing aspects of one illustrative mechanism described herein for adjusting traffic regulators 135 that are used to dynamically regulate traffic that is flowing in a network 110. The various mechanisms disclosed herein may operate within many different types of networks and sizes of networks. For example, the networks illustrated may include small client networks that include only a few computing resources, a service provider network that may include many computing resources, or some other size network. Some portions of the network 110 may have a higher bandwidth as compared to other portions of the network 110. For example, the bandwidth of the network 110 may be larger near an edge of the network 110 (e.g., near the network device 140A) and the bandwidth may be lower at a location that is further from an edge of the network.

As shown in FIG. 1, the network 110 includes network devices 140A-140B, computing resources 120A-120C, traffic regulators 135A-135D, a network traffic manager 150 and a health monitor 165. Respectively, these may be referred to herein singularly as "a network device 140", "a computing resource 120", "an instance 125" and a "traffic regulator 135." In the plural, these may be referred to herein as "the network devices 140", "the computing resources 120", "the instances 125" and "the traffic regulators 135."

The computing resources 120 may include different types of resources, such as, but not limited to data processing resources, data storage resources, database resources, networking resources and other types of computing resources. The networking devices 140 might include network components such as network switches, network routers, network firewalls, intrusion detection systems, and other types of network components that may be configured to perform network regulation and/or routing operations.

As shown in FIG. 1, one or more of the computing resources 120A-120C might include a traffic regulator (e.g., traffic regulators 135A-135C) and one or more network devices 140A-140B might include a traffic regulator 135 (e.g., traffic regulator 135D). As briefly discussed above, a traffic regulator 135 is configured to regulate a flow of network traffic through the traffic regulator 135. In other words, a traffic regulator, such as the traffic regulator 135D, might be configured to change an available bandwidth to one or more different points within the network 110. For example, the traffic regulator 135D might be configured to provide a first available bandwidth between the network device 140A and the computing resource 120B and the computing resource 120C, and to provide a second available bandwidth between the network device 140A and the computing resource 120A. The traffic regulators 135 may be deployed within a network device 140, such as a firewall, a router, a switch or some other computing resource that is configured to perform traffic regulation on received network traffic.

A computing resource 120 may or may not include a traffic regulator 135. In one example, at least one traffic regulator 135 is deployed in the network 110 and is configured to regulate traffic for one or more computing resources 120. In some examples, more than one traffic regulator 135 is deployed between an "edge" of the network 110 and the computing resources 120 within a network. For example, two traffic regulators (the traffic regulator 135D and the traffic regulator 135A) are illustrated in the network 110 as being deployed from an edge of the network 110 to the computing resource 120A that includes one or more instances 125.

The different traffic regulators 135 may have different traffic regulation capabilities. For example, the traffic regulator 135D that is associated with the network device 140A may have the computing resources to process more packets as compared to the traffic regulator 135A that is associated with the computing resource 120A. Similarly, the traffic regulator 135B that is associated with the computing resource 120B may have computing resources that are capable of processing a fewer number of packets as compared to the number of packets that traffic regulator 135D may process. Other traffic regulators 135 may have different computing resources that affect the number of packets that can be processed.

FIG. 1 shows an example that is not intended to be limiting, for adjusting one or more traffic regulators 135 to regulate an available bandwidth for network traffic that is flowing through the one or more traffic regulators 135. In the illustrated example, the attack traffic 160 (represented by a thick dashed line in FIG. 1) enters the network 110 from the network 130, such as a wide area network ("WAN") and flows through the network device 140A before reaching the computing resource 120A that includes instances 125A.

The attack traffic 160 may cause computing resources 120 and/or instances 125 in the network 110 to become unresponsive or inoperable for a variety of different reasons. For example, the attack traffic 160 may overload the processing, network interface, or exhaust the memory of a computing resource, thereby leading to a DoS at the computing resource.

When the attack traffic 160 is detected within the network 110, one or more traffic regulators 135 might be selected to regulate the bandwidth that is available for the attack traffic 160. In one example, a traffic regulator 135 might be deployed or configured at a location in the network 110 that is closer to the entry point of the attack traffic 160 as compared to the location of the computing resource 120 that is receiving the flow of the attack traffic.

The attack traffic 160 may be detected using different mechanisms. For example, in some cases when not overwhelmed by the attack, the computing resources 120 and/or the instances 125 that are under attack may send a message to another computing device, such as to a network traffic manager 150, indicating that it is experiencing an attack. According to another embodiment, the network traffic manager 150, or some other computing device, may detect an attack by monitoring the flow of traffic within the network 110. For example, the network traffic manager 150 may be configured to detect when the volume of network traffic exceeds a predetermined threshold.

Different thresholds may be used depending on the location of the network 110 and/or on the computing resource 120, or computing resources 120, receiving the network traffic. For example, the threshold value near an edge of the network 110 may be set higher as compared to a threshold value deeper within the network. Similarly, the thresholds may be different depending on the capabilities of the computing resource 120A or the instances 125A.

In response to detecting an attack, one or more locations in the network 110 may be identified as locations for performing dynamic traffic regulation of the network bandwidth. According to an embodiment, the network traffic manager 150, or some other computing resource or software component, selects the locations in the network 110 where the dynamic regulation of the available bandwidth is to be performed. For example, a location may be based on the ability of a location within the network 110 to process the amount of attack traffic that is flowing and that is closer to the entry point of the attack traffic. The identification of a location for performing the dynamic traffic regulation might also be based, at least in part, on a capability of the computing resource 120 where the traffic regulator 135 is deployed. For example, it may be determined that one or more computing resources 120 may not have enough computing resources (e.g., memory) to perform the traffic regulation.

As used herein, the phrase "amount of traffic" refers to any countable unit that relates to network traffic. For example, the amount of traffic may relate to a number of bytes, a number of packets, a number of TCP synchronize packets ("SYNs"), a number of IP fragments, and the like that are received over a predetermined time period (e.g., one second). A SYN packet refers to a packet that is typically the first packet that is sent by a computing resource when attempting to connect to another computing resource. In some cases traffic regulators 135 may be deployed at an edge of the network 110 (e.g., at the network device 140A) or in other cases at a different location in the network 110.

During an attack, the traffic regulators 135 possibly in coordination with the network traffic manager 150 and the health monitor 165, are set to a "dynamic mode" and are thereby configured to adjust the available bandwidth for traffic flowing through the traffic regulators 135. In the current example, the traffic regulator 135D and/or the traffic regulator 135A dynamically regulate the available bandwidth for traffic that is flowing toward the instances 125A.

The traffic regulators 135 that are selected to perform dynamic traffic regulation might also be adjusted periodically (e.g., 30 seconds, one minute, five minutes) or in response to some other event. These adjustments to the traffic regulator 135 may increase or decrease the available bandwidth during an attack. For example, when a computing resource (e.g., the computing resource 120A and/or the instances 125A) is determined to be capable of processing more packets during an attack, the available bandwidth that is regulated by the one or more traffic regulators 135 may be increased. When a computing resource is determined to not be capable of processing more packets during an attack, the available bandwidth that is regulated by the one or more traffic regulators 135 may be decreased. In one example, hysteresis is used to assist in reducing switching between increasing and decreasing the available bandwidth.

Health information might also be obtained by a traffic regulator 135 about the computing resources under attack and used when determining whether to increase or decrease the available bandwidth. As discussed above, the health information might be detailed health information for a computing resource (e.g., actual memory use, processor use, or bandwidth use) or non-detailed health information (e.g., the computing resource can or cannot send or receive a message). In one example, not receiving a message from a computing resource within a specified period of time is an indication that the computing resource is under attack. In another example, errors that are obtained from a network interface controller are an indication that a computing resource is under attack. This health information might be provided and/or obtained from the computing resources that are under attack and/or from a health monitor 165, or some other computing resource, such as the network traffic manager 150, that is positioned within the network 110.

In the example that is illustrated in FIG. 1, the traffic regulator 135A and possibly also the traffic regulator 135D may be adjusted to decrease the available bandwidth for the attack traffic 160 until a determination is made by the network traffic manager 150, or some other computing resource, that the computing resource 120A is healthy and that the instances 125A are healthy. For example, a computing resource or an instance might be considered healthy if it is capable of receiving a message or sending a message.

If the computing resource 120A or instances 125A are determined to be healthy during an attack, the traffic regulator 135A and/or the traffic regulator 135D might be adjusted to increase the available bandwidth. As briefly discussed above, this process of dynamically increasing or decreasing the available bandwidth might continue throughout an attack and possibly before and/or after the attack.

When network traffic returns to pre-attack levels (e.g., the flow of the attack traffic ends or reduces) as determined by the network traffic manager 150, the health monitor 165, the traffic regulator 135A or the traffic regulator 135D, the traffic regulation may return to pre-attack traffic regulation. For example, the configuration of the traffic regulator 135A and/or the traffic regulator 135D may be set to a non-attack mode of operation that configures the traffic regulator to regulate traffic at a specified bandwidth until an attack is detected.

As discussed above, the traffic regulators 135 may be configured to regulate network traffic using one or more traffic regulation mechanisms. The utilized traffic regulation mechanisms may include, but are not limited to, dropping packets, prioritizing packets, re-routing packets and storing packets. The traffic regulators 135 reduce the amount of traffic that is flowing to the computing resources that are under attack by using one or more of the traffic regulation mechanisms described above to remove packets from the traffic flow. Through these mechanisms, and potentially others, traffic and bandwidth may regulated during an attack using a traffic regulator 135.

When an attack has ended (e.g., as determined by the network traffic manager 150 or some other computing resource 120), a traffic regulator 135 that has been adjusted to perform the dynamic traffic regulation may be adjusted to a pre-attack configuration (e.g., non-attack mode). In some examples, a traffic regulator 135 may be disabled when an attack has not been detected. More details regarding the mechanisms disclosed herein for dynamic traffic regulation are described below.

Figure 2:
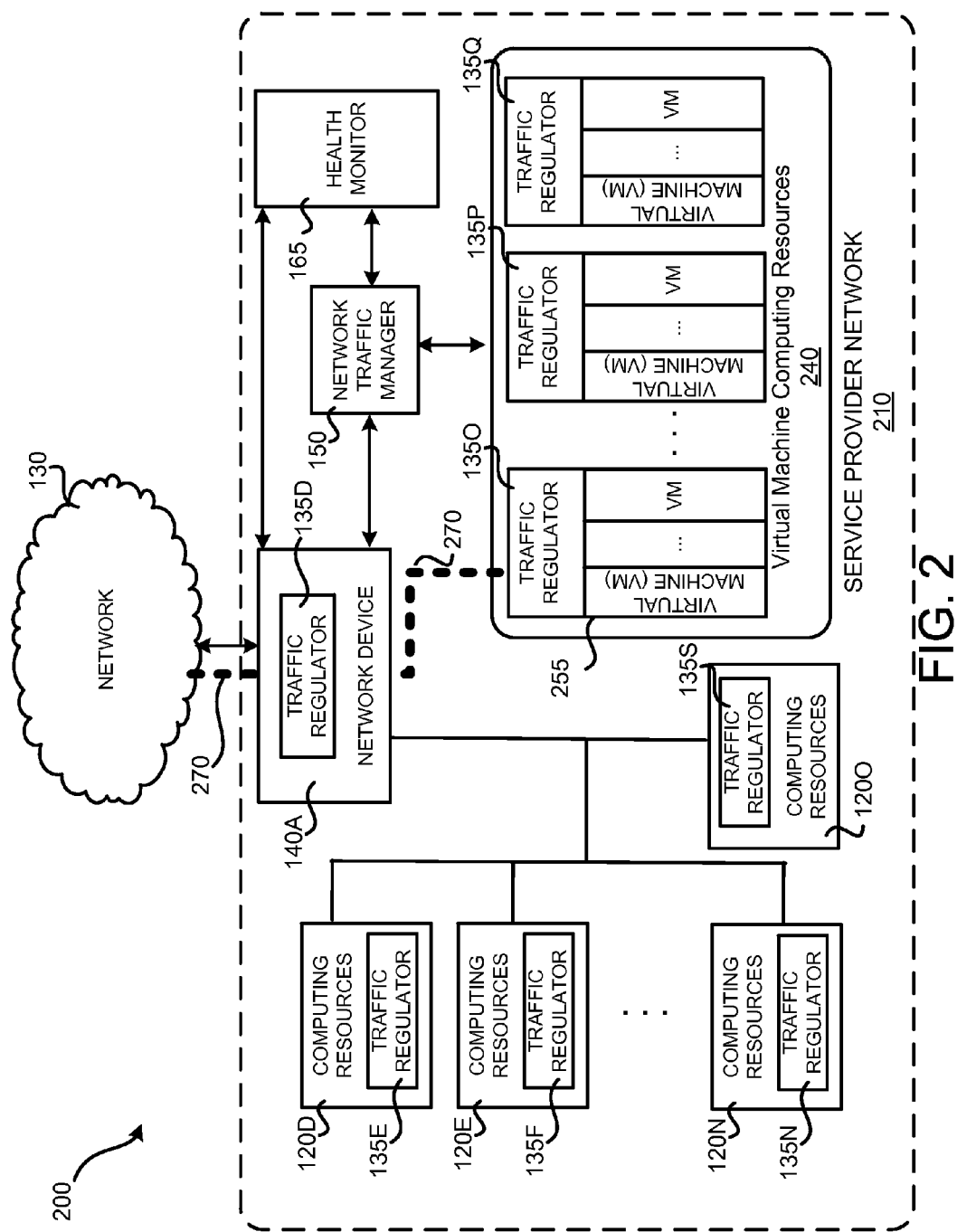
FIG. 2 is a network architecture diagram showing aspects of one illustrative mechanism described herein for dynamically regulating traffic by adjusting one or more traffic regulators in response to detecting attack traffic flowing within a service provider network.

FIG. 2 is a network architecture diagram showing aspects of one illustrative mechanism described herein for dynamically regulating traffic by adjusting one or more traffic regulators 135 in response to detecting attack traffic flowing within a service provider network 210. As illustrated, the service provider network 210 is a service provider network in which customers can purchase and utilize computing resources, such as the computing resources 120D-120O, the virtual machine computing resources 240 including virtual machine instances ("VMs") and a network device 140A. These different resources may be referred to as "resources" or individually as a "resource".

Each type or configuration of a resource may be available from the service provider that operates the service provider network 210 in different sizes and/or configurations. For example, a service provider might offer virtual machine computing resources 240 (e.g., VM instances or other types of data processing resources that are available for purchase and use that may have different configurations of processor capabilities, main memory, disk storage and operating systems). A service provider might also offer other types of resources, such as computing resources 120D-120O for purchase and use by customers. For example, a service provider might offer database resources, file or block data storage resources and/or networking resources, such as load balancing resources, domain name service ("DNS") resources, virtual networking resources and/or other types of resources on a permanent or as-needed basis.

The resources may be provided in one particular implementation by one or more data centers operated by the service provider. Data centers are facilities utilized to house and operate computer systems and associated components. Data centers typically include redundant and backup power, communications, cooling and security systems. The data centers may be located in different geographical locations, and may be connected to various other facilities, such as co-location facilities, and various networks (e.g., the Internet), such as the network 130.

In the environment shown in FIG. 2, a service provider might operate one or more data centers configured to provide the resources in the service provider network 210 to its customers. While a single service provider network 210 is shown in FIG. 2, the service provider network 210 might include many different networks that are in geographically disparate locations. All or a portion of these different networks may be configured for dynamic traffic regulation utilizing one or more traffic regulators 135. Exemplary details regarding the implementation of a service provider network 210 for providing the functionality disclosed herein is described below with regard to FIGS. 7 and 8.

According to an embodiment, resources in the service provider network 210 are provisioned and de-provisioned as needed in an automated fashion. For example, a customer might submit a request to the service provider network 210 to instantiate a computing resource, such as an instance of a virtual machine using virtual machine computing resources 240. In response to receiving such a request, a provisioning component (not shown in FIG. 2), or one or more other components within the service provider network 210, might create the new virtual machine instance as requested by the customer. The customer may then be permitted to utilize the new virtual machine instance as desired. Other types of computing resources 120 might be instantiated and utilized in a similar fashion.

When a customer has finished using a computing resource, such as a virtual machine instance, the customer may request that the resource be de-provisioned. In response thereto, a provisioning component or another component in the service provider network 210 may cause the resource to be de-provisioned. Other types of computing resources might also be provisioned and de-provisioned in a similar manner.

As illustrated in FIG. 2, the computing resources 120 in the service provider network 210 may be located behind one or more traffic regulators 135, such as traffic regulators 135D-135Q. The traffic regulators 135 may be deployed at one or more locations in the service provider network 210. For example, the traffic regulators 135 may be deployed as network devices 140, computing resources 120, and/or deployed as software that is located on the network devices 140, or the computing resources 120.

FIG. 2 also illustrates an example of a network attack in which the attack traffic 270 (represented by a thick dashed line in FIG. 2) originates outside of the service provider network 210 and flows through the network device 140A before reaching a server computing device 255 that includes a traffic regulator 135O and one or more VMs. As discussed above, attack traffic, such as the attack traffic 270, may be detected by the different computing resources 120 that are associated with a network, such as the service provider network 210. For example, the network traffic manager 150 may detect the attack traffic 270 flowing toward the traffic regulator 135O. Alternately, other computing resources 120 may detect the attack traffic 270 and send a message to the network traffic manager 150 indicating that a network attack is occurring.

In the example shown in FIG. 2, the network traffic manager 150 identifies locations in the service provider network 210 that have the capability to regulate the attack traffic 270. For example, the network traffic manager 150 may determine if various locations in the service provider network 210 that are in the path of the attack traffic 270 have the available bandwidth, processing power and memory to regulate the attack traffic.

As discussed above, a traffic regulator 135 may be placed into a dynamic mode of operation during an attack. The dynamic mode configures the traffic regulator 135 for dynamic regulation of the bandwidth that is available to be used by the flow of the attack traffic 270. As discussed herein, different locations in a network, such as the service provider network 210, may be selected for performing traffic regulation. In one example, the initial settings and configuration of the traffic regulators 135 are based on the packet processing capabilities of the VMs that are under attack and the packet processing capabilities of the server computing device 255 that is receiving the traffic flow. The packet processing capabilities of a VM might be related to a size of the VM. For example, different sized VMs may be able to process a different number of operations per second, have a different number of processors available for use, have different sizes of memory, and the like. Generally, the larger the size of the VM, the more processing power of the VM.

As discussed above, the traffic regulators 135 that are selected to regulate the bandwidth may increase or decrease the available bandwidth dynamically based on a determination of the health of the computing resources 120 that are under attack. In one example, the network traffic that is flowing toward computing resources that are not under attack is prioritized by the traffic regulators 135 over the attack traffic. For example, when attack traffic is flowing toward one of the VMs that is hosted on the server computing device 135, the traffic regulator 135 dynamically adjusts the available bandwidth to the VM that is under attack and allows network traffic more freely to flow to other VMs that are hosed on the server computing device 135. Generally, the traffic regulators 135 attempt to continue the flow of the network traffic to the computing resources that are not under attack. Once the attack is determined to have ended, the configuration of the traffic regulators 135 might be changed. For example, the configuration of the traffic regulators 135 may be changed to a non-attack mode of operation or changed to a mode of operation that adjusts bandwidth at a lower rate as compared to when an attack is occurring in the service provider network 210.

It should be appreciated that the configuration of the service provider network 210 shown in FIG. 2 has been simplified for discussion purposes. A service provider network 210 might include many more hardware and software components than illustrated in FIG. 2 and described above. Additionally, the service provider network 210 might include many other components, such as networks, networking components, data stores and other components than those specifically identified herein.

Figure 3:
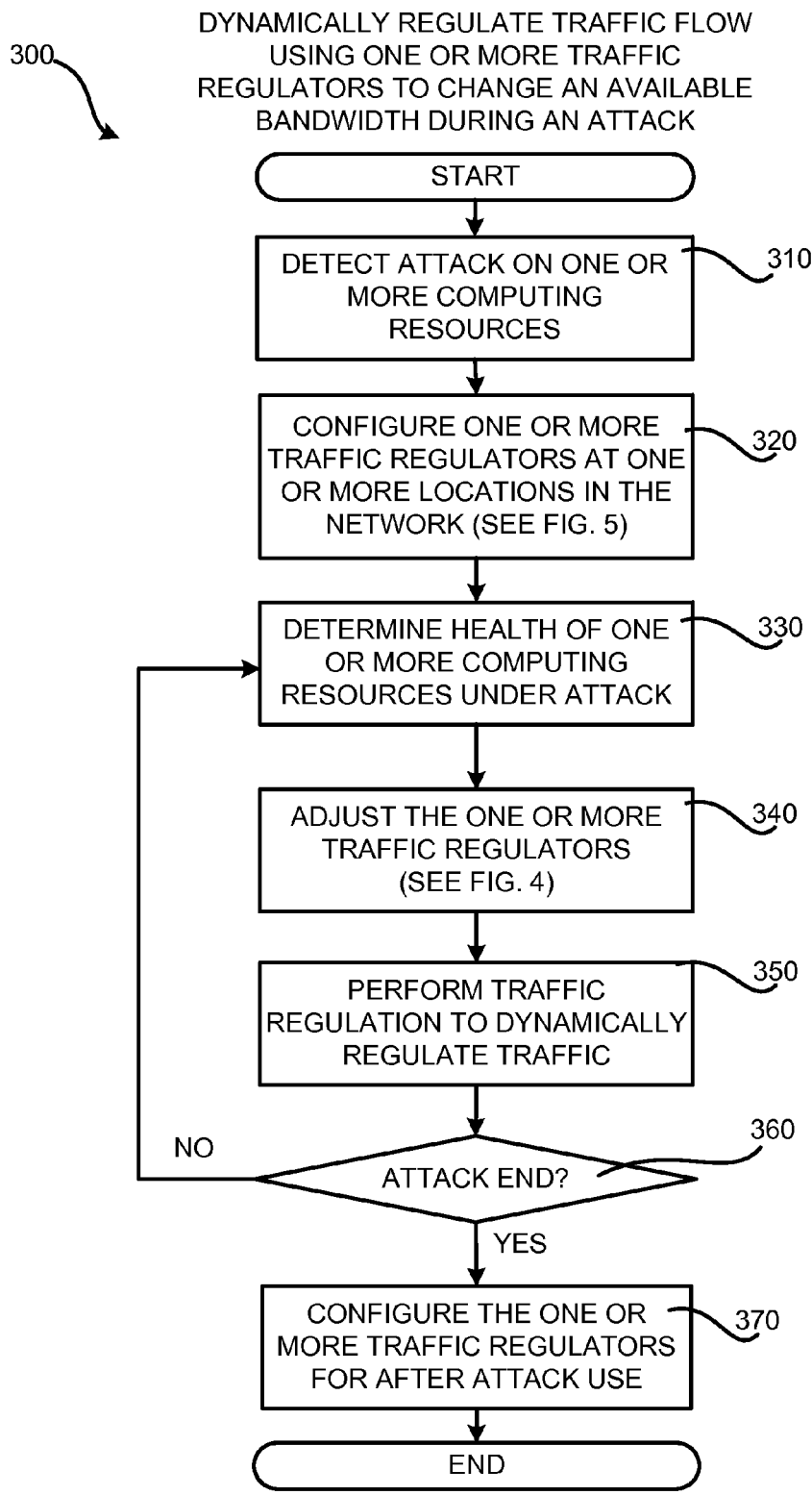
FIG. 3 illustrates a routine for dynamically regulating traffic that is flowing toward one or more computing resources in a network during an attack.
Figure 4:
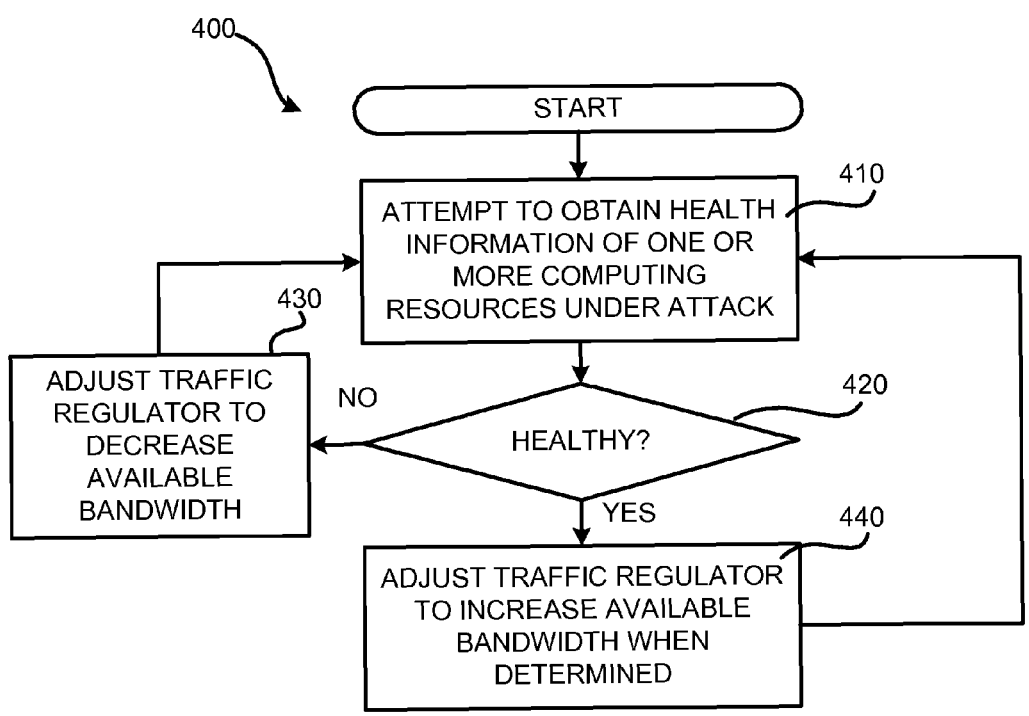
FIG. 4 illustrates a routine for dynamic traffic regulation by adjusting one or more traffic regulators during an attack to change an available bandwidth.
Figure 5:
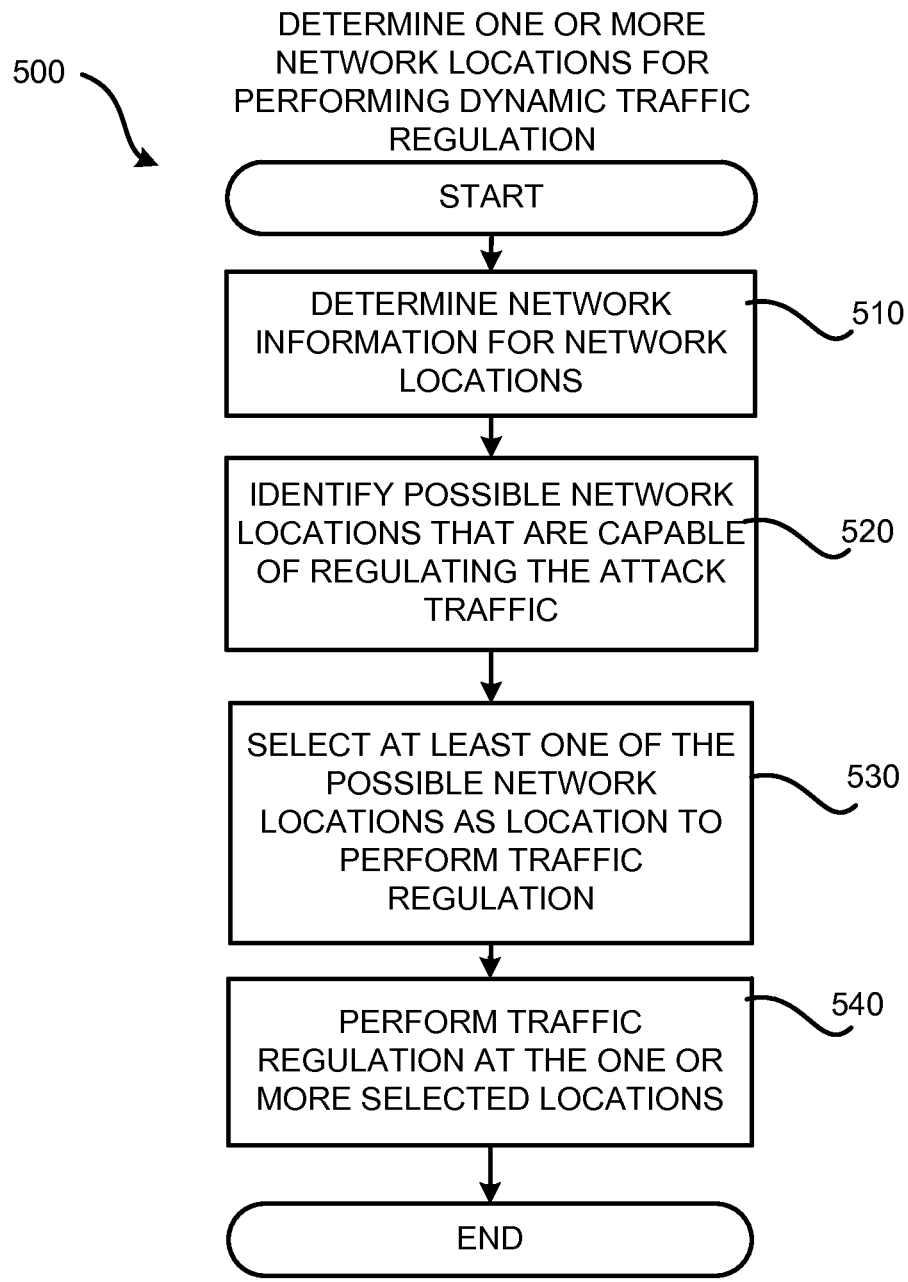
FIG. 5 illustrates a routine for determining one or more network locations used for performing dynamic traffic regulation.

FIGS. 3-5 are flow diagrams showing routines that illustrate aspects of dynamic traffic regulation utilizing one or more traffic regulators, according to embodiments disclosed herein. It should be appreciated that the logical operations described herein with respect to FIGS. 3-5, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 3 illustrates a routine 300 for dynamically regulating network traffic that is flowing toward one or more computing resources in a network during an attack. The routine 300 begins at operation 310, where an attack on one or more computing resources (e.g., computing resources 120 and/or instances 125) in a network is detected. As discussed above, various types of analyses may be performed in order to determine that an attack is occurring within a network. For example, a network traffic manager 150 (as described herein), or some other computing resource 120, might monitor the network traffic within the network and detect that the traffic is attack traffic.

In one example, and as discussed above, an attack is detected by determining that an amount of traffic that is flowing past a point in the network exceeds a threshold within a predetermined time period. For example, attack traffic may be detected in response to determining that the number of data packets flowing through a network device or a computing resource within a ten-second period exceeds a specified threshold. One or more thresholds may be defined and used to detect when traffic flowing within a network is attack traffic. For example, a larger threshold may be utilized with reference to network traffic near the edge of a network where the bandwidth for the network may be higher, and a lower threshold may be utilized with regard to traffic flowing in other portions of the network that may have a lower bandwidth.

From operation 310, the routine 300 proceeds to operation 320, where one or more traffic regulators 135 are configured at one or more locations in the network. As discussed above, the traffic regulators 135 might be configured differently. As also discussed above, the configuration of a traffic regulator 135 before an attack might be different from the configuration of the traffic regulator 135 after an attack is detected. The traffic regulators 135 that are selected for use may be located at one or more network locations. More details regarding identifying the location or locations in a network where traffic regulation is to be performed will be provided below with regard to FIG. 5.

From operation 320, the routine 300 proceeds to operation 330, where the health of one or more computing resources 120 that are under attack may be determined. As discussed above, the health information might be detailed health information for a computing resource 120 (e.g., actual memory use, processor use, or bandwidth use) or non-detailed health information. For example, a determination may be made as to whether the computing resources 120 that are under attack can send or receive a message to/from another computing device, such as the network traffic manager 150. This health information might be obtained from the computing resources 120 and/or instances 125 that are under attack, from a health monitor 165 that is positioned within the network, or from another system or component.

From operation 330, the routine 300 proceeds to operation 340, where one or more traffic regulators 135 may be adjusted during the attack for dynamically regulating the traffic, and possibly for some time before and/or after the attack. As discussed above, the traffic regulators 135 might be adjusted to decrease the available bandwidth until a determination is made that the computing resources under attack are healthy. When the computing resources 120 are determined to be healthy during the attack, the traffic regulator 135 might be adjusted to increase the available bandwidth to the attack traffic flowing through the traffic regulator 135.

From operation 340, the routine 300 proceeds to operation 350, where the traffic regulators 135 perform dynamic traffic regulation. As discussed above, dynamic traffic regulation might be implemented by dropping data packets, prioritizing data packets, re-routing data packets and/or storing data packets. Different data packet dropping mechanisms may be used. For example, data packets received by a traffic regulator 135 might be dropped based on the address of the source and/or destination. In another example, the data packets (e.g., header and/or data part of the data packets) may be inspected by the traffic regulator 135, or some other computer resource 120, for other information that may be used in dropping the data packets.

The data packets might be prioritized by dynamic traffic regulation to determine what data packets to drop. Generally, traffic that is classified as "important" is given priority over traffic that is classified as "unimportant." Data packets might also be re-routed to limit the number of packets flowing through the traffic regulators 135. Data packets might also be stored to limit the number of data packets flowing through the one or more traffic regulators 135. For example, some packets may be temporarily stored (e.g., in a buffer) for possible later delivery when the bandwidth increases.

From operation 350, the routine 300 proceeds to decision operation 360, where a determination is made as to whether the attack has ended. As discussed above, a determination that an attack has ended may be made using different mechanisms. For example, and without limitation, the end of an attack might be based on the amount of network traffic dropping below a predetermined threshold (e.g., a typical amount of traffic in the network) for a period of time (e.g., 60 minutes). When an attack is determined not to have ended, the routine 300 returns to operation 330. When an attack is determined to have ended, the routine 300 proceeds to operation 370.

From operation 360, the routine 300 proceeds to decision operation 370, where the one or more traffic regulators 135 are configured for use after an attack. As discussed above, the traffic regulators 135 may be disabled or configured to a different mode of operation (e.g., a non-attack mode of operation). The routine 300 then proceeds to an end operation. Alternately, the routine 300 may repeat some or all of the operations described above. For example, from operation 370, the routine 300 may proceed back to operation 310.

FIG. 4 illustrates a routine 400 for dynamic traffic regulation by adjusting one or more traffic regulators 135 during an attack to change an available bandwidth. The routine 400 begins at operation 410, where an attempt is made to obtain health information for computing resources 120 (e.g., physical computing devices, customer instances). The health information that is obtained might be detailed health information such as, but not limited to actual memory use, processor use, or bandwidth use, or non-detailed health information, such as whether the computing resource 120 or instance 125 can send or receive a message. As discussed above, this health information might be obtained from computing resources 120 or instances 125 that are under attack, from a health monitor 165 that is positioned within the network, or from another system or component. In some cases, the health information may or may not be obtained from the computing resources that are under attack.

From operation 410, routine 400 proceeds to decision operation 420, where a determination is made as to whether the computing resources 120 that are under attack are healthy. As discussed above, different mechanisms may be used to determine whether a computing resource is healthy. In one example, a computing resource 120 is healthy if it can either send or receive a message. In other examples, a computing resource may be determined to be healthy based on the resources being used by the computing resource (e.g., memory usage and processor utilization below a predetermined level, number of packet errors below a threshold). The routine 400 proceeds to operation 430 in response to determining that the computing resources or instances that are under attack are unhealthy. The routine 400 proceeds to operation 440 in response to determining that the computing resources or instances that are under attack are healthy.

At operation 430, the traffic regulators 135 may be adjusted to decrease the available bandwidth. As discussed above, decreasing the available bandwidth at a location in the network that is before the computing resources 120 might free up enough capability for the one or more computing resources 120 to be considered healthy during an attack.

At operation 440, one or more traffic regulators 135 are adjusted to increase the available bandwidth when determined. As discussed above, the traffic regulators 135 may be adjusted based on a current amount of attack traffic, the packet-processing capability of the computing resources, and the like. In some cases, increasing the available bandwidth may cause the computing resources 120 to be determined to be unhealthy at the next dynamic adjustment of the traffic regulator 135. For example, the computing resources 120 may not have enough processing resources available to handle the increased bandwidth. As discussed above, hysteresis may be used to reduce switching between reducing the available bandwidth and increasing the available bandwidth. From operations 430 and 440, the routine 400 proceeds back to operation 410, where the various operations described above may be repeated. As discussed above, in one example, the operations shown in FIG. 4 are repeated until the traffic returns to pre-attack levels (e.g., the flow of the attack traffic ends or reduces).

FIG. 5 illustrates a routine 500 for identifying one or more network locations to be used for performing dynamic traffic regulation. The routine 500 begins at operation 510, where network information for different network locations where a traffic regulator 135 may be utilized are determined. The network information may include various types of information. For example, the network information may include an available bandwidth of the network at a network location, the processing capability of a device at a network location, the memory available to a device at a network location and the like.

From operation 510, the routine 500 proceeds to operation 520, where the possible network locations that have the computing resources and available bandwidth to regulate the attack traffic are identified. In some examples, the closer the possible network location is to an edge of the network, the more likely that the possible network location has the capability to regulate the attack traffic.

From operation 520, the routine 500 proceeds to operation 530, where at least one of the possible network locations is selected as a location for the dynamic traffic regulation that is performed by the one or more traffic regulators 135. As discussed above, the selection of the location may be made using different mechanisms. For example, and without limitation, the network location that is closest to the computing resources 135 that are under attack and that is capable of regulating the attack traffic may be selected. As another example, the network location that is closest to the entry point of the attack traffic may be selected. For example, when the attack traffic originates from outside of the network, the network location that is selected may be near the edge of the network. In other examples, two or more network locations may be selected. For example, one traffic regulator 135 may reduce a first portion of the attack traffic and another traffic regulator 135 at a second location in the network may reduce a further portion of the attack traffic.

From operation 530, the routine 500 proceeds to operation 540, where the traffic regulation is performed at the selected network location when determined. The routine 500 then proceeds to an end operation. Alternately, the routine 500 may return to processing other operations. For example, from operation 540, the routine 500 may proceed back to operation 510.

Figure 6:
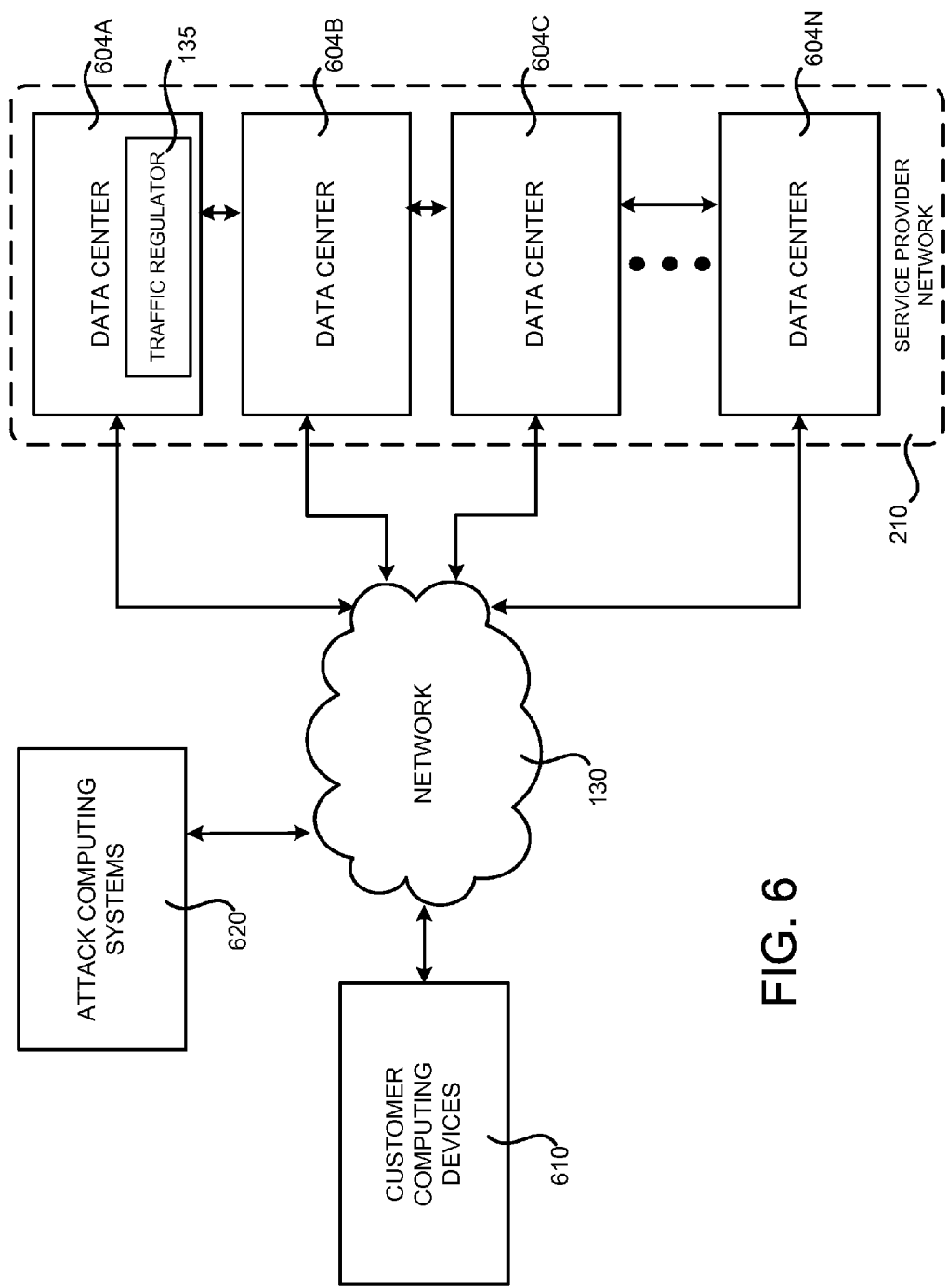
FIG. 6 is a system and network diagram that shows one illustrative operating environment for the embodiments disclosed herein that includes a service provider network.

FIG. 6 and the following description are intended to provide a brief, general description of a suitable computing environment in which the embodiments described herein may be implemented. In particular, FIG. 6 is a system and network diagram that shows an illustrative operating environment that includes a service provider network 210. As discussed above, the service provider network 210 can provide virtual machine instances and other types of computing resources on a permanent or an as-needed basis.

The computing resources provided by the service provider network 210 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 210 are enabled in one implementation by one or more data centers 604A-604N (which may be referred to herein singularly as "a data center 604" or collectively as "the data centers 604"). The data centers 604 are facilities utilized to house and operate computer systems and associated components. The data centers 604 typically include redundant and backup power, communications, cooling and security systems. The data centers 604 might also be located in geographically disparate locations. One illustrative configuration for a data center 604 that implements some or all of the concepts and technologies disclosed herein for annotating resources in the service provider network 210 will be described below with regard to FIG. 7.

One or more network traffic regulators, such as the traffic regulators 135, may be used to regulate network traffic within the service provider network 210. For example, the traffic regulator 135D may be used to regulate attack traffic flowing from attack computing systems 620 and flowing toward the computing resources 120 in a data center, such as data center 604A.

The users and customers of the service provider network 210 may access the computing resources provided by the data centers 604 over a suitable data communications network, such as a WAN, as illustrated by the network 130. Although a WAN might be used, it should be appreciated that a local-area network ("LAN"), the Internet, or any other networking topology known in the art that connects the data centers 604 to the customer computing devices 610, may be utilized. It should also be appreciated that combinations of such networks might also be utilized.

Figure 7:
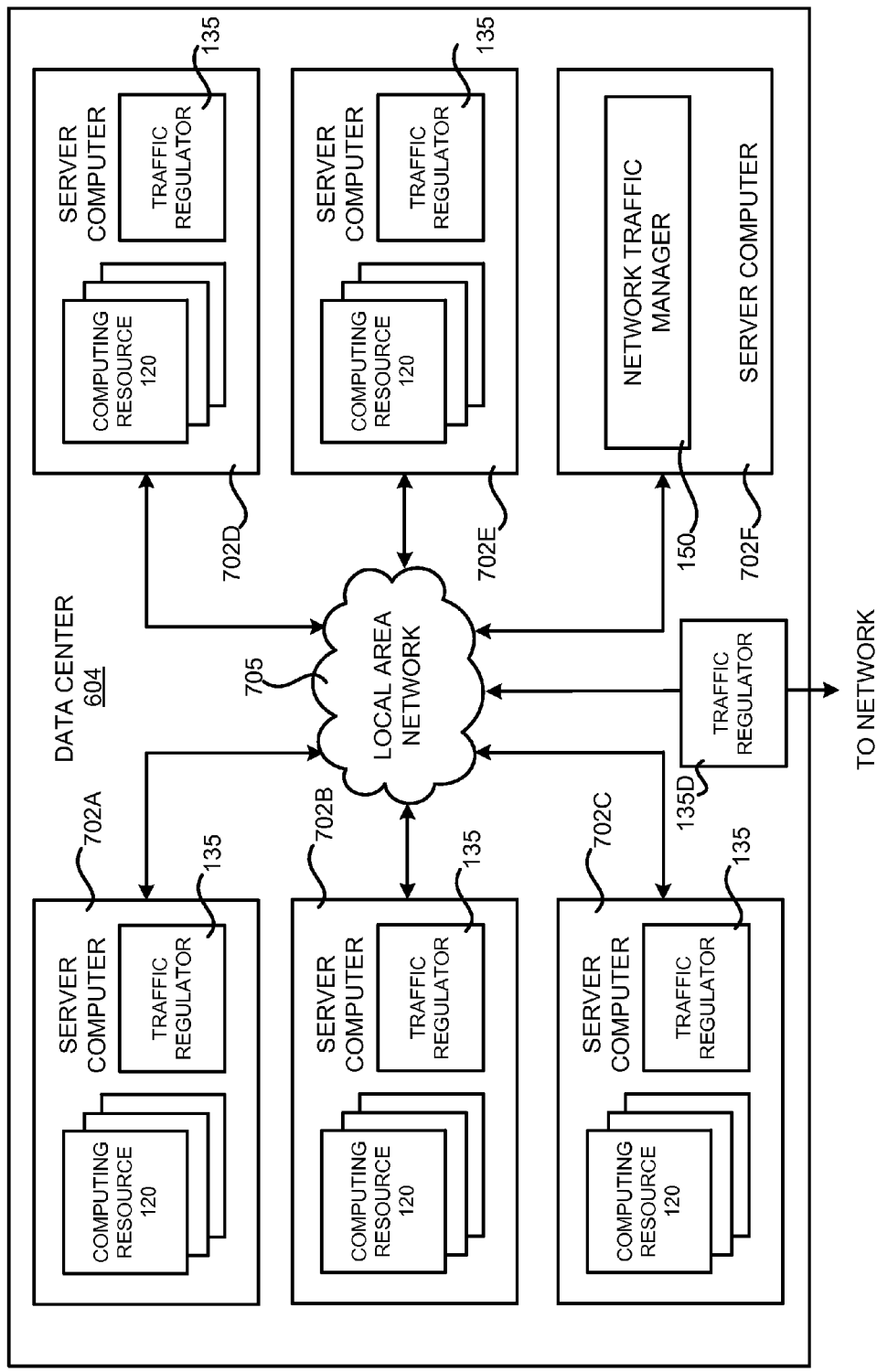
FIG. 7 is a computing system diagram that illustrates one configuration for a data center that implements aspects of a service provider network, including some or all of the concepts and technologies disclosed herein for dynamic traffic regulation.

FIG. 7 is a computing system diagram that illustrates one configuration for a data center 604 that implements aspects of a service provider network 210, including some or all of the concepts and technologies disclosed herein for dynamic traffic regulation. The example data center 604 shown in FIG. 7 includes several server computers 702A-702F (which may be referred to herein singularly as "a server computer 702" or in the plural as "the server computers 702") for providing computing resources. The server computers 702 may be standard tower or rack-mount server computers configured appropriately for providing the computing resources described herein. According to an embodiment, the server computers 702 are configured to execute the software products as described above.

In one embodiment, some of the computing resources 120 are virtual machine instances. As known in the art, a virtual machine instance is an instance of a software implementation of a machine (i.e. a computer) that executes programs like a physical machine. Each of the server computers 702 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 702, for example.

It should be appreciated that although the embodiments disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 604 shown in FIG. 7 also includes a server computer 702F reserved for executing software components for managing the operation of the data center 604, the server computers 702, virtual machine instances, and other resources within the service provider network 210. The server computer 702F might also execute the network traffic manager 150 as well as other components that are described above. Details regarding the operation of each of these components has been provided above. In this regard, it should be appreciated that while these components are illustrated as executing within the service provider network 210, computing systems that are external to the service provider network 210 might also be utilized to execute some or all of these components. Other configurations might also be utilized.

In the example data center 604 shown in FIG. 7, an appropriate LAN 705 is utilized to interconnect the server computers 702A-702E and the server computer 702F. The LAN 705 is also connected to the network 130 illustrated in FIG. 6. It should be appreciated that the configuration and network topology illustrated in FIGS. 6 and 7 has been greatly simplified and that many more computing systems, networks and networking devices may be utilized to interconnect the various computing systems disclosed herein. Appropriate load balancing devices or software modules might also be utilized for balancing a load between each of the data centers 604A-604N, between each of the server computers 702A-702F in each data center 604 and between virtual machine instances and other types of computing resources provided by the service provider network 210. The example data center 604 shown in FIG. 7 includes the network traffic regulators 135 for performing traffic regulation at various network locations.

It should be appreciated that the data center 604 described in FIG. 7 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 8:
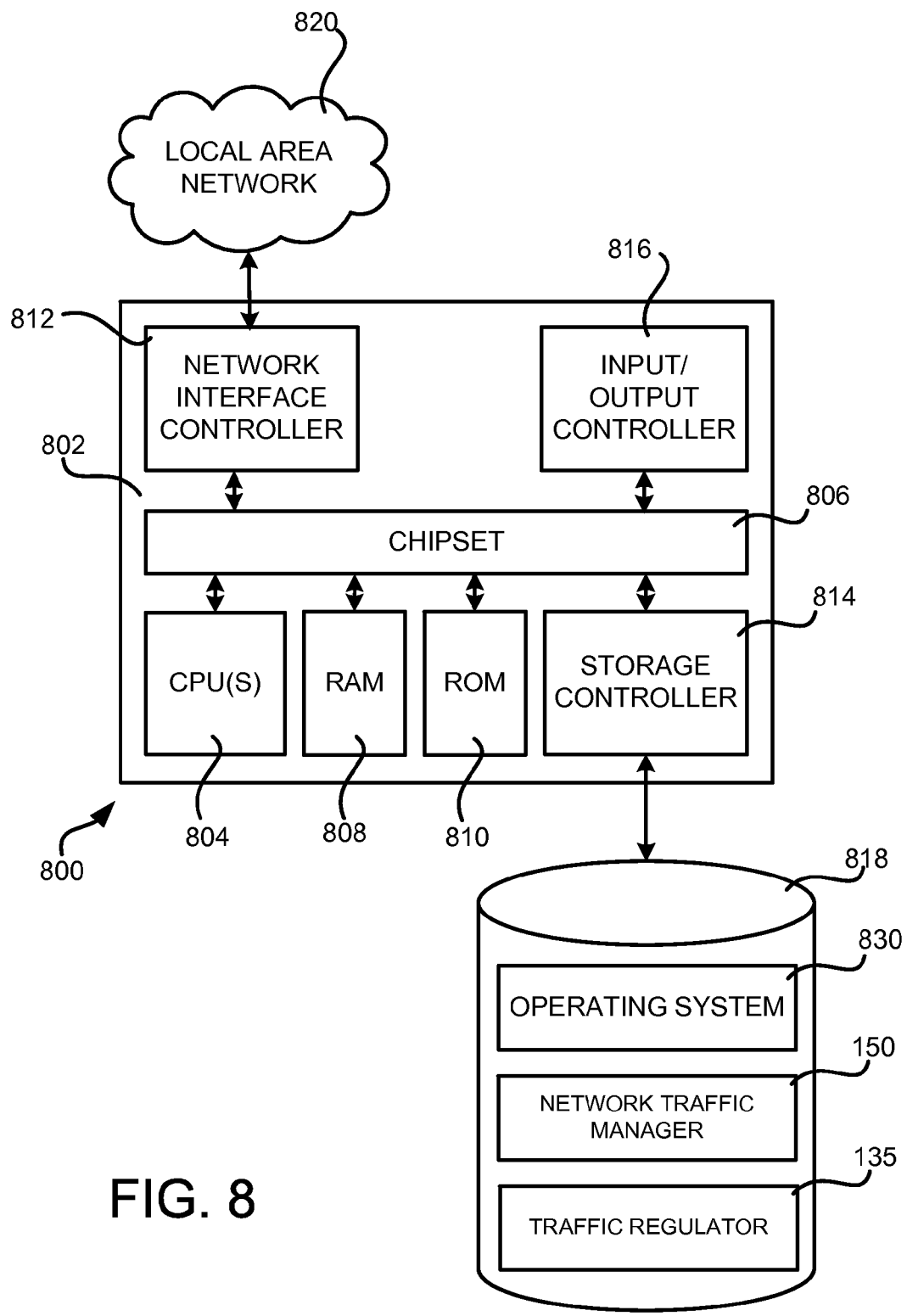
FIG. 8 is a computer architecture diagram showing one illustrative computer hardware architecture for implementing a computing device that might be utilized to implement aspects of the various embodiments presented herein.

FIG. 8 shows an example computer architecture for a computer 800 capable of executing program components for dynamically regulating traffic flow in the manner described above. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 8 may be utilized to execute software components for performing operations as described above. The computer architecture shown in FIG. 8 might also be utilized to implement a customer computing device 610, or any other of the computing systems described herein.

The computer 800 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 806 provides an interface between the CPUs 804 and the remainder of the components and devices on the baseboard 802. The chipset 806 may provide an interface to a RAM 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the embodiments described herein.

The computer 800 may operate in a networked environment using logical connections to remote computing devices and computer systems through a network, such as the local area network 820. The chipset 806 may include functionality for providing network connectivity through a network interface controller ("NIC") 812, such as a gigabit Ethernet adapter. The NIC 812 is capable of connecting the computer 800 to other computing devices over the local area network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 818 may store other system or application programs and data utilized by the computer 800, such as components that include the network traffic manager 150, a traffic regulator 135 and/or any of the other software components and data described above. The mass storage device 818 might also store other programs and data not specifically identified herein.

In one embodiment, the mass storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various routines and traffic regulation mechanisms described above with regard to FIGS. 3-5. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for dynamically regulating network traffic flow during an attack have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for regulating network traffic flowing in a network comprising one or more computing resources, the method comprising:
   receiving network traffic flowing in the network, the network traffic flowing in the network toward virtual machine instances that are hosted on the one or more computing resources;
   utilizing at least one traffic regulator to regulate an amount of available bandwidth for the network traffic, the available bandwidth including at least a first bandwidth for attack traffic and a second bandwidth for traffic that is not the attack traffic;
   detecting an attack on at least one of the virtual machine instances in the network based at least in part on detecting that a portion of the network traffic flowing in the network toward the at least one of the virtual machine instances is the attack traffic; and
   in response to detecting the attack in the network,
      determining that the attack traffic originates outside of the network,
      selecting, as at least one selected traffic regulator, the at least one traffic regulator for performing traffic regulation, the at least one selected traffic regulator being at an edge of the network and being selected from one or more traffic regulators;
      transmitting, periodically and during the attack, one or more messages to a computing resource hosting the at least one of the virtual machine instances to determine whether the first bandwidth is to be adjusted;
      adjusting the at least one selected traffic regulator to regulate the first bandwidth for the attack traffic, wherein the adjusting comprises:
         increasing the first bandwidth based at least in part on the computing resource hosting the at least one of the virtual machine instances being capable of sending a response to an individual message of the one or more messages or receiving the individual message of the one or more messages, and
         decreasing the first bandwidth based at least in part on the computing resource hosting the at least one of the virtual machine instances not being capable of sending the response to the individual message of the one or more messages or receiving the individual message of the one or more messages; and
      wherein during the attack, the first bandwidth for the attack traffic is decreased before decreasing the second bandwidth that is available to another portion of the network.

2. The computer-implemented method of claim 1, wherein regulating the first bandwidth for the attack traffic comprises performing one or more of dropping data packets, prioritizing data packets, re-routing data packets, or storing data packets.

3. The computer-implemented method of claim 1, wherein detecting the attack on the at least one of the virtual machine instances in the network comprises determining whether an amount of the network traffic exceeds a threshold that is based at least in part on packet-processing capabilities of the virtual machine instances.

4. The computer-implemented method of claim 1, further comprising identifying one or more locations in the network for performing traffic regulation based, at least in part, on a third bandwidth of the network at the one or more locations.

5. The computer-implemented method of claim 1, wherein the message is a first message, and the traffic regulation further comprises:
   sending, at a time separate from when the first message is sent, a second message to the computing resource hosting the at least one of the virtual machine instances, and
   readjusting the at least one selected traffic regulator to regulate the first bandwidth for the attack traffic based at least in part on whether the computing resource hosting the at least one of the virtual machine instances is capable of receiving the second message or sending a response to the second message.

6. The computer-implemented method of claim 1, further comprising:
   determining that the attack in the network has ended, and
   based on the attack in the network having ended, ceasing to transmit the one or more messages to the computing resource hosing the at least one of the virtual machines instances.

7. A system, comprising:
   one or more traffic regulator devices configured to regulate a bandwidth that is used by network traffic flowing in a network;
   one or more processors; and
   one or more non-transitory computer-readable media storing computer-executable instructions that, when executed by the one or more processors, cause the one or more processors to:
      determine an amount of the network traffic flowing in the network toward computing resources,
      determine that one or more of the computing resources are under attack from a source outside the network,
      select at least one traffic regulator device for performing traffic regulation, the at least one traffic regulator device being at an edge of the network and selected from the one or more traffic regulator devices;
      transmitting, periodically and during the attack, one or more messages to the one or more computing resources to determine whether to adjust the bandwidth that is used by the network traffic flowing in the network toward the one or more of the computing resources that are under attack; and
      utilize the at least one traffic regulator device to regulate the bandwidth that is used by the network traffic flowing in the network toward the one or more of the computing resources that are under attack such that the bandwidth that is available to attack traffic is decreased before decreasing the bandwidth that is available to a portion of the network traffic that is not the attack traffic, wherein regulating the bandwidth comprises adjusting an available bandwidth for the attack traffic based at least in part on whether the one or more of the computing resources is capable of sending a response to an individual message of the one or more messages or receiving the individual message of the one or more messages.

8. The system of claim 7, wherein the computer-executable instructions further cause the one or more processors to adjust the at least one traffic regulator device to a dynamic mode of operation in response to the determination that the one or more of the computing resources are under attack.

9. The system of claim 7, wherein the computer-executable instructions further cause the one or more processors to perform one or more actions to drop packets, prioritize packets, re-route packets, or store packets such that the amount of the network traffic flowing in the network toward the computing resources is reduced.

10. The system of claim 7, wherein the computer-executable instructions further cause the one or more processors to periodically determine the amount of the network traffic in response to a flow of the attack traffic in the network.

11. The system of claim 7, wherein the computer-executable instructions further cause the one or more processors to identify one or more locations in the network at which to use the at least one traffic regulator device, the one or more locations being closer to the edge of the network than locations of the one or more computing resources.

12. The system of claim 7, wherein the computer-executable instructions further cause the one or more processors to periodically send an additional message to the one or more of the computing resources, and determine whether the one or more computing resources is capable of at least one of receiving the additional message or sending a response to the additional message.

13. The system of claim 7, wherein at least one of the one or more traffic regulator devices is a server computer.

14. The system of claim 7, wherein at least one of the one or more computing resources is a virtual machine instance.

15. The system of claim 7, wherein selecting the at least one traffic regulator device that is at the edge of the network is based at least in part on at least one of: the source of the attack traffic in the network, the destination of the attack traffic in the network, the network location of the at least one traffic regulator device, the capability of the at least one traffic regulator device, and the configuration of the at least one traffic regulator device.

16. A non-transitory computer-readable storage medium having computer-executable instructions stored thereupon which, when executed by one or more computers, cause the one or more computers to:
receive network traffic that is flowing in a network toward computing resources;
detect that at least a portion of the network traffic is attack traffic that is flowing toward at least one of the computing resources based at least in part on an amount of the network traffic that is flowing in the network;
determine that the attack traffic is originating from a source outside the network;
select at least one traffic regulator that is at an edge of the network for performing traffic regulation; and
for at least as long as the attack traffic is detected in the network, cause the one or more computers to:
periodically transmit a message to the at least one of the computing resource to determine whether the at least one of the computing resources is capable of sending or receiving messages,
utilize the at least one traffic regulator to regulate an available bandwidth for the attack traffic is based at least in part on the at least one of the computing resources is capable of sending a response to the message or receiving the message, and
wherein for at least as long as the attack traffic is detected in the network a first bandwidth of the network traffic that is the attack traffic is decreased before decreasing a second bandwidth of a flow of the network traffic that is not the attack traffic.

17. The non-transitory computer-readable storage medium of claim 16, having further computer executable instructions stored thereupon which, when executed by the one or more computers, cause the one or more computers to:
increase the first bandwidth in response to determining that the at least one of the computing resources is capable of receiving the message or sending a response to the message, and
decrease the first bandwidth in response to determining that the at least one of the computing resources is not capable of receiving the message or sending the response to the message.

18. The non-transitory computer-readable storage medium of claim 16, having further computer-executable instructions stored thereupon which, when executed by the one or more computers, cause the one or more computers to drop packets, prioritize packets, re-route packets, or store packets to regulate the first bandwidth.

19. The non-transitory computer-readable storage medium of claim 16, having further computer-executable instructions stored thereupon which, when executed by the one or more computers, cause the one or more computers to identify a plurality of locations in the network for regulating the attack traffic.

20. The non-transitory computer-readable storage medium of claim 16, having further computer-executable instructions stored thereupon which, when executed by the one or more computers, cause the one or more computers to detect that the network traffic is the attack traffic in response to determining that the amount of the network traffic that is flowing in the network exceeds a predetermined packet processing capability of the at least one of the computing resources.

* * * * *